US012639186B2

(12) United States Patent
Kawaguchi et al.

(10) Patent No.: US 12,639,186 B2
(45) Date of Patent: May 26, 2026

(54) INFORMATION TRANSMISSION METHOD

(71) Applicant: DISCO CORPORATION, Tokyo (JP)

(72) Inventors: Yoshihiro Kawaguchi, Tokyo (JP);
Naoto Odate, Tokyo (JP); **Takayuki
Masada**, Tokyo (JP)

(73) Assignee: DISCO CORPORATION, Tokyo (JP)

( * ) Notice: Subject to any disclaimer, the term of this
patent is extended or adjusted under 35
U.S.C. 154(b) by 30 days.

(21) Appl. No.: 18/760,339

(22) Filed: Jul. 1, 2024

(65) Prior Publication Data

US 2025/0013548 A1     Jan. 9, 2025

(30) Foreign Application Priority Data

Jul. 6, 2023     (JP) ................................. 2023-111315

(51) Int. Cl.
*G06F 11/32*          (2006.01)
*H04N 23/60*        (2023.01)
(52) U.S. Cl.
CPC ........... *G06F 11/321* (2013.01); *H04N 23/60*
(2023.01)
(58) Field of Classification Search
CPC ............... G06F 11/321; G06F 11/0772; G06F
11/0775; G06F 11/327; H04N 23/60;
G06K 17/0022; G06K 7/1408; G06K
19/06009; H01L 21/67288
USPC .......................................................... 714/48
See application file for complete search history.

(56) References Cited

U.S. PATENT DOCUMENTS

2016/0123600 A1*   5/2016   Phillips ................... F24C 7/082
99/337
2022/0269446 A1*   8/2022   Sasaguri ............... G06F 3/1292

FOREIGN PATENT DOCUMENTS

JP          2022-159797 A      10/2022

* cited by examiner

*Primary Examiner* — Yair Leibovich
(74) *Attorney, Agent, or Firm* — Greenblum & Bernstein,
P.L.C.

(57)                ABSTRACT

An information transmission method to be implemented in
an information transmission system including a processing
apparatus configured to process an objective material, a
communication apparatus, and a responsive device commu-
nicably connected with the communication apparatus, is
provided. The method includes controlling the processing
apparatus to generate an error identification code indicating
error information concerning an error occurring in the
processing apparatus and controlling a display of the pro-
cessing apparatus to display the generated error indication
code; and controlling an image capturing unit in the com-
munication apparatus to read the error identification code
displayed on the display in the processing apparatus and
controlling a communication unit in the communication
apparatus to transmit the error information included in the
error identification code to the responsive device.

3 Claims, 4 Drawing Sheets

INFORMATION TRANSMISSION METHOD

CROSS REFERENCE TO RELATED APPLICATION

This application is based upon and claims the benefit of priority from the prior Japanese Patent Application No. 2023-111315, filed on Jul. 6, 2023; the entire contents of which are incorporated herein by reference.

FIELD

The present invention relates to an information transmission method.

BACKGROUND

A processing apparatus that may process an objective material such as a semiconductor wafer is known. Moreover, a substrate processing system, in which processing conditions may be applied to a processing apparatus not connected to a network, is disclosed (See, for example, Japanese Patent Publication 2022-159797 A).

However, in the known art, when an error occurs in the processing apparatus, and if the processing apparatus is not connected to a communication line, it may be difficult for a responder other than an operator of the processing apparatus to recognize error information concerning the error in the processing apparatus. Therefore, there is a demand that a processing apparatus, even when not connected to a communication line, may transmit error information to the responder easily.

SUMMARY

The present invention has been made in view of the above, and an object thereof is to provide an information transmission method enabling easy transmission of error information from a processing apparatus not connected to a communication line to a responsive device.

According to the present invention, an information transmission method to be implemented in an information transmission system including a processing apparatus configured to process an objective material, a communication apparatus, and a responsive device communicably connected with the communication apparatus, includes controlling the processing apparatus to generate an error identification code indicating error information concerning an error occurring in the processing apparatus and controlling a display in the processing apparatus to display the generated error indication code; and controlling an image capturing unit in the communication apparatus to read the error identification code displayed on the display in the processing apparatus and controlling a communication unit in the communication apparatus to transmit the error information included in the error identification code to the responsive device.

DESCRIPTION OF EMBODIMENTS

Figure 1:
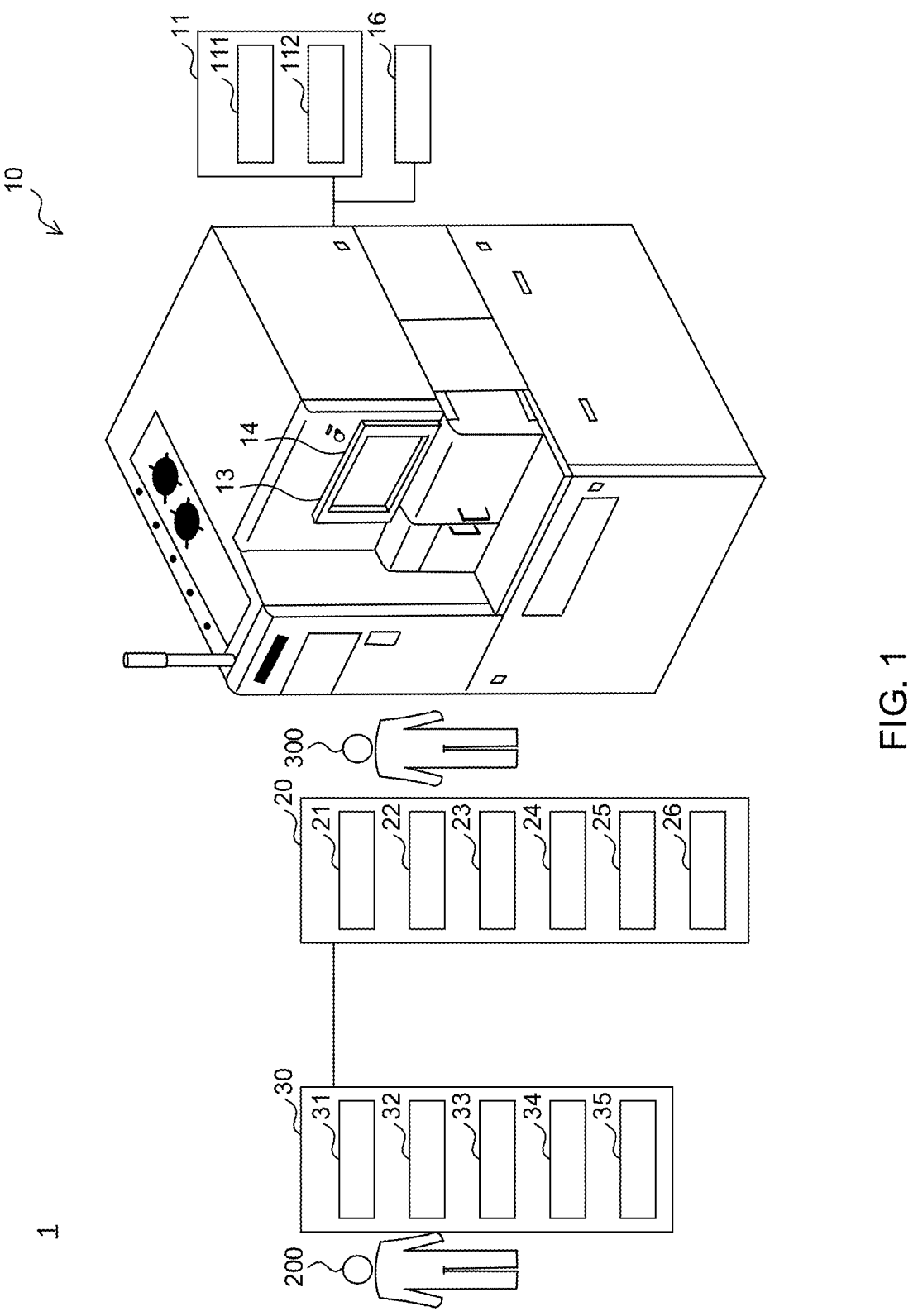
FIG. 1 is a diagram illustrating an example of an information transmission system that implements an information transmission method of the present embodiment.
Figure 2:
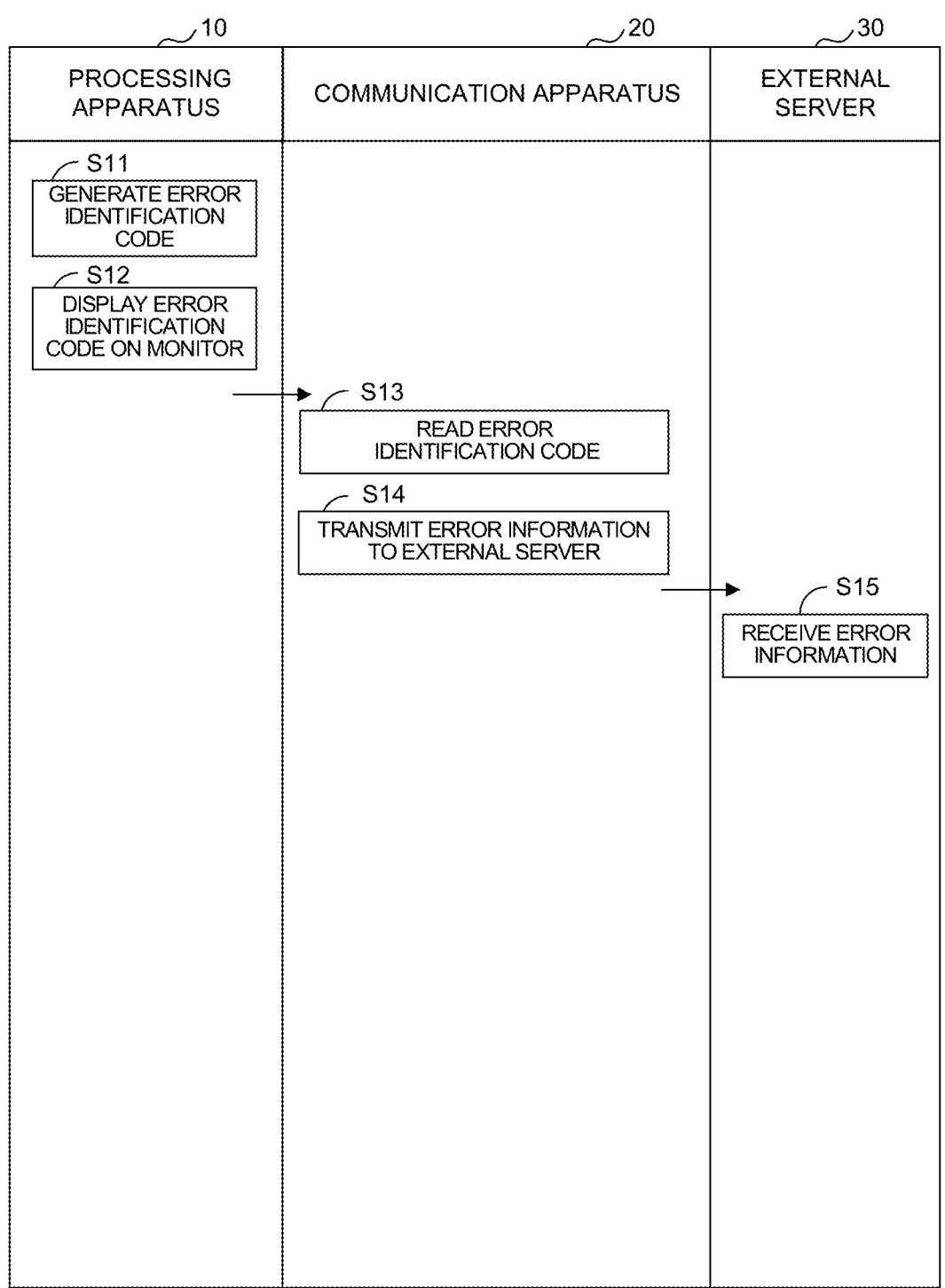
FIG. 2 is a sequence chart illustrating an example of a first process in the information transmission method of the present embodiment.
Figure 3:
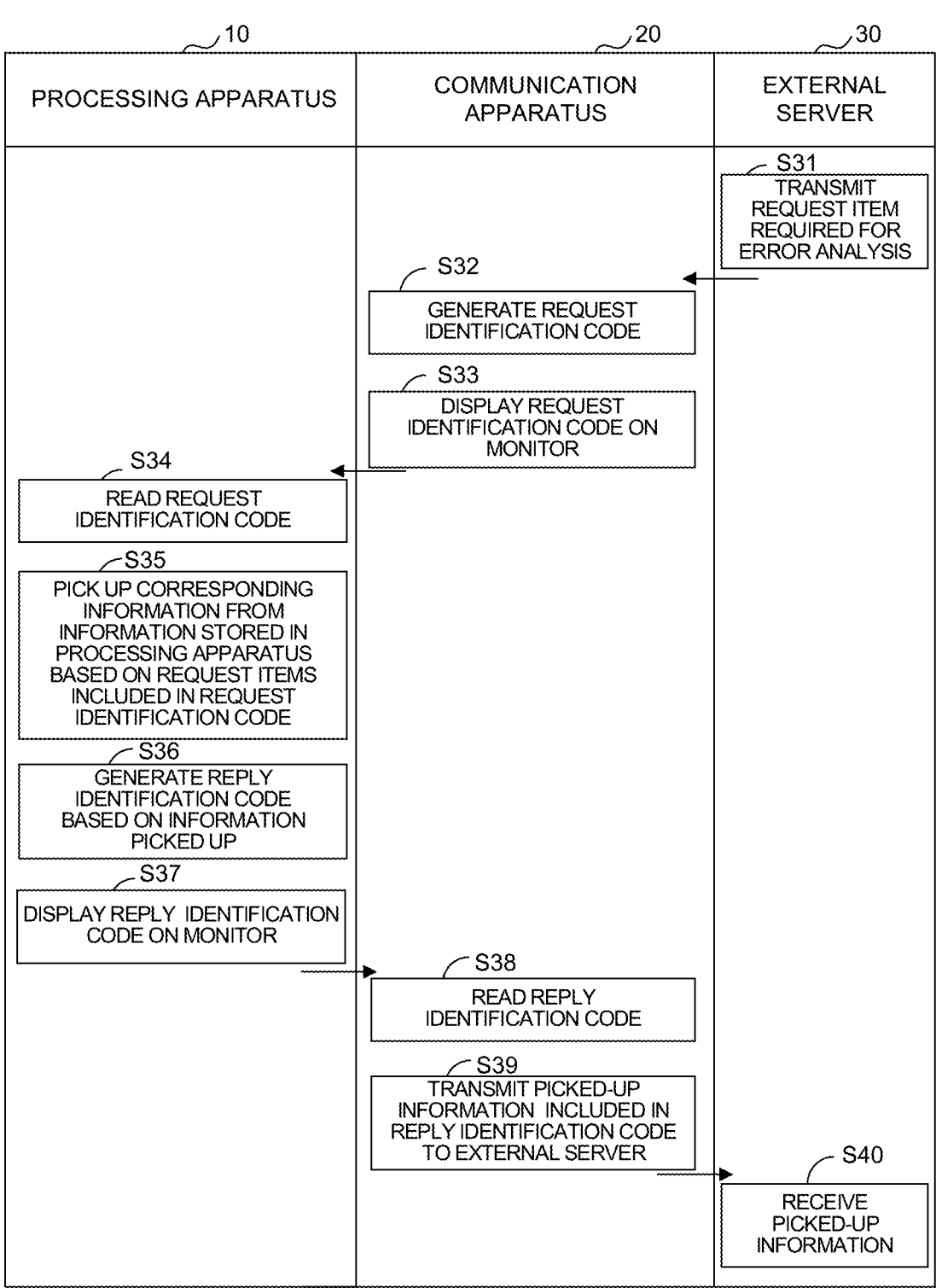
FIG. 3 is a sequence chart illustrating an example of a second process in the information transmission method of the present embodiment.
Figure 4:
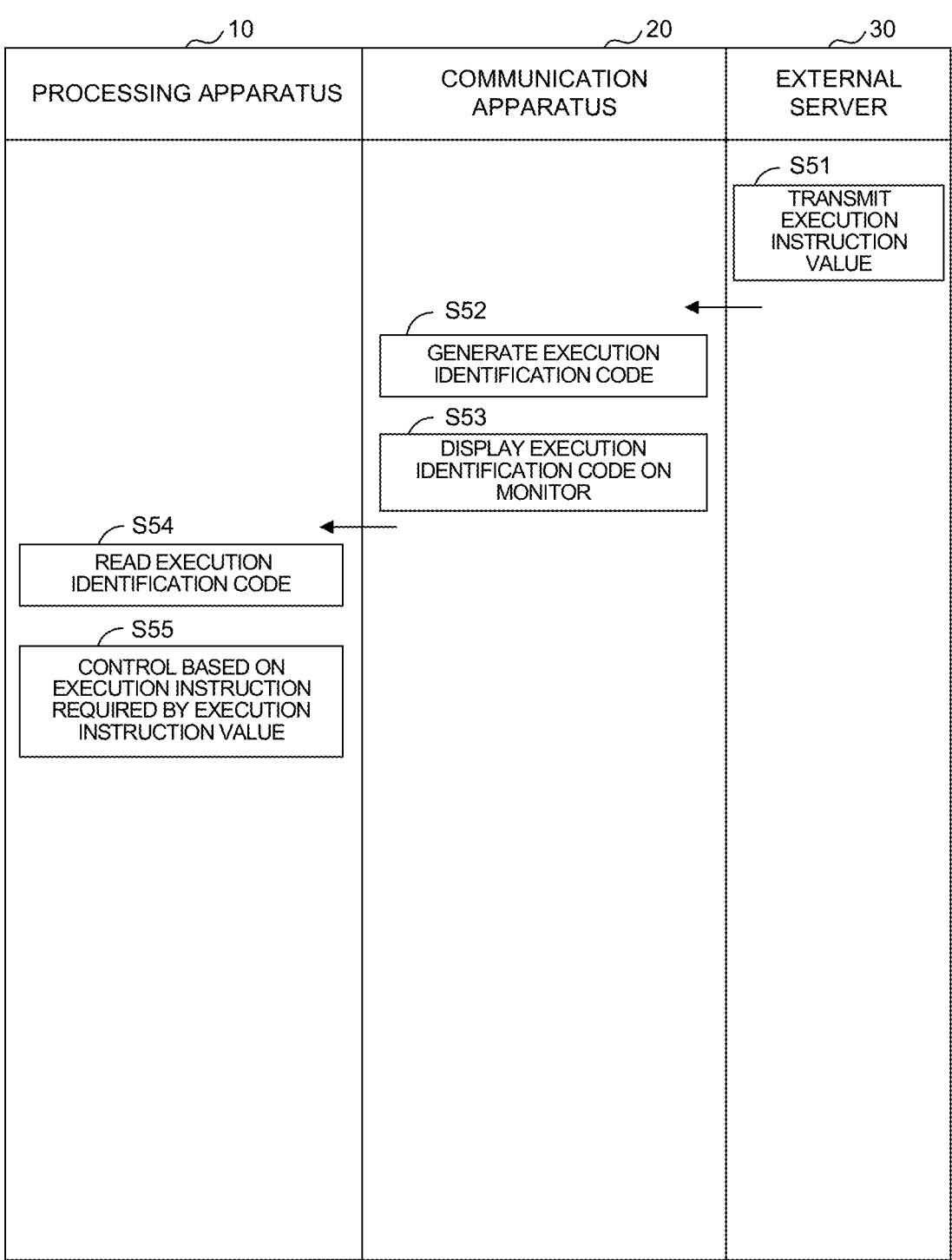
FIG. 4 is a sequence chart illustrating an example of a third process in the information transmission method of the present embodiment.

An information transmission method according to the present embodiment will be described with reference to FIGS. 1 through 4. The information transmission method implemented by an information transmission system 1 according to the present embodiment includes a first process, a second process, and a third process described below. The first process, the second process, and the third process may be performed continuously or independently. The first process includes an error identification code generation step and an error information transmission step. The second process includes a request step, a request identification code display step, a request read step, a reply identification code generation step, and a reply transmission step. The third process includes an execution command step, an execution identification code display step, and an execution control step. FIG. 1 is a diagram illustrating an example of an information transmission system that implements the information transmission method of the present embodiment. FIG. 2 is a sequence chart illustrating an example of the first process in the information transmission method of the present embodiment. FIG. 3 is a sequence chart illustrating an example of the second process in the information transmission method of the present embodiment. FIG. 4 is a sequence chart illustrating an example of the third process in the information transmission method of the present embodiment.

The information transmission system 1 for implementing the information transmission method according to the present embodiment includes a processing apparatus 10, a communication apparatus 20, and an external server 30 as an example of a responsive device. Note that the responsive device in the information transmission system 1 of the present invention is not limited to the external server 30. When communication between the communication apparatus 20 and another communication apparatus used by a responder adopts the P2P communication protocol not requiring an intervening external server, the another communication apparatus used by the responder serves as a responsive device. Optionally, the information transmission system 1 illustrated in FIG. 1 may include an apparatus other than the processing apparatus 10, the communication apparatus 20, and the external server 30.

The processing apparatus 10 is an apparatus that may process an object material such as a semiconductor wafer. The processing apparatus 10 is not communicably connected, either by wire or wirelessly, to other devices that compose the information transmission system 1. The processing apparatus may include, for example, a cutting apparatus, a grinding apparatus, a polishing apparatus, a plasma processing apparatus, a laser processing apparatus, a carving apparatus, an inspection apparatus, a tape-bonding apparatus, a tape-peeling apparatus, a cleaning apparatus, a film-forming apparatus, a resin-bonding apparatus, or the like. The processing apparatus 10 includes a control unit 11, a display 13, an input device 14, and an image capturing unit 16.

The control unit 11 includes a controller 111 (processor) and a storage 112 (memory).

The controller 111 generates signals for controlling components in the processing apparatus 10. The controller 111 controls operations of the components in the processing apparatus 10 by reading and executing programs stored in the storage 112.

The storage 112 stores the programs and various types of information to be used by the controller 111 for controlling the processing apparatus 10. The storage 112 may store execution instruction values for controlling the processing apparatus 10 as the information to be stored in the storage 112. The execution instruction values include setting values for controlling behaviors of the units that compose the processing apparatus 10, execution values for instructing driving of the units that compose the processing apparatus 10, and a request item, which is information concerning a type of data necessary for a responder 200 who operates the external server 30 to analyze an error, requested by the responder 200. The programs for controlling the processing apparatus 10 include a program for controlling the processing apparatus 10 based on an identification code read from the communication apparatus 20 and a program for generating the identification code. In the present embodiment, the identification code includes a one-dimensional code and a two-dimensional code. The one-dimensional code includes a barcode and the like. The two-dimensional code includes a QR code (registered trademark), Data Matrix, PDF417, and the like.

The display 13 is, for example, a monitor of an LCD and may display an operation screen, an identification code, and the like to an operator 300 who operates the processing apparatus 10 under the control of the controller 111. The input device 14 is a touch panel integrated with the display 13 and may receive an instruction input by the operator 300. The information being input is provided to the controller 111. The input device 14 may receive input of the setting values, the execution instruction values, and the like based on the instruction input by the operator 300. The input device 14 may be a keyboard or a mouse.

The image capturing unit 16 may capture an image of the identification code displayed by the communication apparatus 20 and provide the controller 111 with the image captured data. The image capturing unit 16 includes, for example, a camera.

The communication apparatus 20 is communicably connected to the external server 30 by wire or wirelessly. The communication apparatus 20 includes, for example, a smartphone, a tablet terminal, and a notebook personal computer (PC). The communication apparatus 20 includes a controller 21 (processor), a storage 22 (memory), a display 23, an input device 24, a communication unit 25, and an image capturing unit 26.

The controller 21 generates signals for controlling the components in the communication apparatus 20. The controller 21 controls operations of the components in the communication apparatus 20 by reading and executing programs stored in the storage 22.

The storage 22 stores the programs and various types of information to be used by the controller 21 for controlling the communication apparatus 20. The programs for controlling the communication apparatus 20 include a program for transmitting error information based on error information read from the processing apparatus 10, a program for converting information concerning an identification code read from the processing apparatus 10 into a character string, and the like.

The display 23 is, for example, a monitor of an LCD and may display an operation screen, an identification code, and the like to the operator 300 who operates the communication apparatus 20 under the control of the controller 21. The input device 24 is a touch panel integrated with the display 23 and may receive an instruction input by the operator 300. The information being input is provided to the controller 21. The input device 24 may receive input of the setting values, the execution instruction values, and the like based on the instruction input by the operator 300. The input device 24 may be a keyboard or a mouse.

The communication unit 25 has a communication function and includes a communication interface (not shown), through which the communication apparatus 20 may communicate with another device via a network of the information transmission system 1 under the control of the controller 21. The communication apparatus 20 may communicate through the communication unit 25 and thereby exchange data with the external server 30 in the information transmission system 1.

The image capturing unit 26 may capture an image of the identification code displayed by the processing apparatus 10 and provide the controller 21 with data of the captured image. The image capturing unit 26 may be composed of, for example, a camera.

The external server 30 is communicably connected to the communication apparatus 20 by wire or wirelessly. The external server 30 includes, for example, a mail server, a WEB server, and the like. The external server 30 is connected to a PC on a site of a manufacturer (not illustrated) through the Internet, and the manufacturer may access to the external server 30 through the PC to acquire data. The external server 30 functions as a responsive device allocated as a destination of the error information being transmitted. The external server 30 includes a controller 31, a storage 32, a display 33, an input device 34, and a communication unit 35.

The controller 31 generates signals for controlling the components in the external server 30. The controller 31 controls operations of the components in the external server 30 by reading and executing programs stored in the storage 32.

The storage 32 stores the programs and various types of information to be used by the controller 31 for controlling the external server 30.

The display 33 is, for example, a monitor of an LCD and may display an operation screen, the identification code, and the like to the responder 200 who operates the external server 30 under the control of the controller 31. The input device 34 is a touch panel integrated with the display 33 and may receive an instruction input by the responder 200. The information being input is provided to the controller 31. The input device 34 may receive input of the setting values, the execution instruction values, and the like based on the instruction input by the responder 200. The input device 24 may be a keyboard or a mouse.

The communication unit 35 has a communication function and includes a communication interface (not shown), through which the external server 30 may communicate with another device via the network of the information transmission system 1 under the control of the controller 31. The external server 30 may communicate through the communication unit 35 and thereby exchange data with the communication apparatus 20 in the information transmission system 1.

Next, the information transmission method implemented by the information transmission system 1 according to the present embodiment will be described. The information transmission method according to the present embodiment may be implemented preferably in the order of the first process, the second process, and the third process. Hereinafter, the steps to be performed in the information transmission method according to the present embodiment will be described.

In the first process included in the information transmission method, the error identification code generation step and the error information transmission step are performed.

In the error identification code generation step, the processing apparatus 10 generates an error identification code as an identification code indicating error information concerning the processing apparatus 10.

The error information refers to information concerning an error or an irregular condition that occurred during the operation of the processing apparatus 10 and is usable data to be used for specifying a problem or troubleshooting. The error information includes, for example, an error code, an error message, occurrence time information, and occurrence location information.

The error code includes, for example, a numerical value or a character string for uniquely identifying a specific error. Identification of the error code may be used for identifying and solving a problem related to the trouble in the processing apparatus 10.

The error message includes text information indicating a cause or content of the error, and additional detailed information or context information related to the error. The error message may include conditions of the units composing the processing apparatus 10, a log of a related event, a history of an error, and the like. By identifying the error message, the responder 200 may be prompted to understand the error and find a solution to cope with the error easily.

The occurrence time includes a date and time when the error occurred and a time stamp. By recognizing the occurrence time, the occurrence time may be used as a temporal reference point in troubleshooting or identifying a cause of the problem.

The occurrence location includes a specific location in the processing apparatus 10 where the error occurred, an installation location of the processing apparatus 10 in a factory, a line number in a source code, a path of a log, and the like. By identifying the occurrence location, location where the error occurred may be specified.

The error identification code is composed of an identification code including error information. That is, the error information is embedded in the error identification code. For example, the processing apparatus 10 may generate an error identification code, e.g., a QR code, including information of "2023/04/17, 10:54:23, error code (E1234), third sheet in full auto" as error information concerning the processing apparatus 10. Optionally, the processing apparatus 10 may embed information noting that, for example, a conveyer arm has been failing to draw a frame of a designated object workpiece out of a cassette, in the error identification code as the error information.

The processing apparatus 10 displays the generated error identification code on the monitor of the display 13. For example, the processing apparatus 10 displays the QR code including the error information on the monitor of the display 13. By displaying the QR code on the display 13, the communication apparatus 20 is enabled to read the error information.

In the error information transmission step, the communication apparatus 20 reads the error identification code and transmits the error information included in the error identification code to the external server 30. For example, when the processing apparatus 10 displays a QR code as the error identification code on the monitor of the display 13, the communication apparatus 20 may acquire the error information from the processing apparatus 10 by activating the image capturing unit 26 and reading the QR code displayed on the processing apparatus 10 through the image capturing unit 26. The communication apparatus 20 converts the information of the error identification code into a character string. The communication apparatus 20 transmits the converted error information to the external server 30 through the communication unit 25. As such, the error information indicating the error condition of the processing apparatus 10 not connected to the communication line may be easily transmitted to the external server 30 from the communication apparatus 20. Thereafter, the external server 30 may display the error information on the monitor of the display 33. For example, since the error information includes the information indicating "2023/04/17, 10/54/23, error code (E1234), third sheet in full auto", the communication apparatus 20 may inform the responder 200 who operates the external server 30 that an error with the error code "E1234" occurred while the third sheet of the wafers is being conveyed in the full auto mode at 10:54:23 on Apr. 17, 2023. As such, the man-hours of the operator 300 who operates the processing apparatus 10 to inform the external server 30 of the situation of the processing apparatus 10, not connected externally to devices such as the external server 30 through the communication line, may be reduced.

In the second process included in the information transmission method, the request step, the request identification code display step, the request read step, the reply identification code generation step, and the reply transmission step are performed.

In the request step, the external server 30 transmits a request for information concerning type(s) of data necessary for analyzing the error, among the information recorded in the processing apparatus 10, i.e., request item(s) requested by the responder 200, from the external server 30 to the communication apparatus 20. The request item is an item of information necessary for the responder 200 to analyze an error of the processing apparatus 10. The request items include, for example, information such as a history of the same error that has occurred within a predetermined period from the present time, the number of occurrences and frequency of the same error within the predetermined period, a change history of setting data related to driving of the units in the processing apparatus that has occurred most recently, and information concerning the number of processed sheets of the object material such as wafers since the power is turned on most recently. The external server 30 may receive, for example, a request including the request items input through the input device 34 according to the operation by the responder 200. The external server 30 transmits the request including the request items received from the responder 200 to the communication apparatus 20 through a communication line such as the Internet.

In the request identification code display step, the communication apparatus 20 generates a request identification code in response to the request including the request items transmitted from the external server 30. Further, the communication apparatus 20 displays the generated request identification code on the display 23 of the communication apparatus 20.

The request identification code is composed of identification codes including items of data. That is, in the request identification code, information concerning items of data that are needed to be inspected, among the data concerning the condition of the processing apparatus 10, is embedded. The items of data may each be a character string.

In the request step of the above-described embodiment, the responder 200 who has inspected the error information concerning the processing apparatus 10 transmitted to the external server 30 from the communication apparatus 20 may designate the items of data to request to the processing apparatus 10 manually. Alternatively, an automatic response program recorded in the external server 30 may automatically designate the items of data to request to the processing apparatus 10 and transmit the request for the items of data to the communication apparatus 20. In the latter case, the external server 30 has a storage to record data items, which are associated with the error information, to request to the processing apparatus 10, and a program that may request the data to be transmitted from the communication apparatus 20 according to the acquired error information.

In the above-described embodiment, the external server 30 may request the data to be transmitted from the communication apparatus 20 in a format of a character string or a numerical value, and the communication apparatus 20 may generate a request identification code and display the request identification code on the display 23. Alternatively, the external server 30 may generate a request identification code including the items of data to request and transmit the information to the communication apparatus 20 in the format of the request identification code.

In the request read step, the processing apparatus 10 reads the request identification code through the image capturing unit 16 installed in the processing apparatus 10. For example, when the communication apparatus 20 displays a QR code as the request identification code on the display 23, the processing apparatus 10 may acquire error analysis information (information concerning the types of the data necessary for error analysis, that is, information in the request items) from the communication apparatus 20 by activating the image capturing unit 16 and reading the QR code displayed on the communication apparatus 20 through the image capturing unit 16.

In the reply identification code generation step, the processing apparatus 10 generates a reply identification code being an identification code that includes the data requested by the request identification code.

The data requested by the request identification code is information concerning the processing apparatus 10 picked up by the processing apparatus 10 from the information stored in the storage 112 of the processing apparatus 10, based on the request items included in the request identification code, after the request read step.

The processing apparatus 10 generates the reply identification code based on the picked-up information. The picked-up information is information picked based on the data requested by the request identification code. The reply identification code is composed of an identification code, which includes the information picked up based on the data requested by the request identification code. That is, in the reply identification code, the information having been picked up based on the data requested by the request identification code is embedded. The picked-up information may be a character string. The processing apparatus 10 may generate, for example, a QR code including the following items (1) through (3) of information picked up based on the request items included in the request identification code as the reply identification code.

(1) "2022/12/23, 15:23:13" and "2022/12/20, 11:10:53", which are information concerning the occurrence history and frequency of the same error that has occurred within the predetermined period from the present time.

(2) "Most recent conveyance data change is change of the drawing height from 120.0 to 120.5", which is a change history of the setting data of the units in the processing apparatus 10 that has occurred most recently (3) "312 sheets", which is information concerning the number of processed sheets of the object material such as a wafer since the power was turned on most recently.

The processing apparatus 10 displays the generated reply identification code on the display 13 of the processing apparatus 10. For example, the processing apparatus 10 may display the QR code including the information picked up based on the data requested by the request identification code on the monitor of the display 13. By displaying the QR code on the display 13, the communication apparatus 20 is enabled to read the information picked up based on the data requested by the request identification code.

In the reply transmission step, the communication apparatus 20 reads the reply identification code and transmits the information picked up based on the data requested by the request identification code to the external server 30. For example, when the processing apparatus 10 displays the QR code as the reply identification code on the monitor of the display section 13, the communication apparatus 20 may acquire the information picked up by the processing apparatus 10 based on the data requested by the request identification code from the processing apparatus 10 by activating the image capturing unit 26 and reading the QR code displayed on the processing apparatus 10 with the image capturing unit 26. The communication apparatus 20 has a program for converting the information in the reply identification code into a character string. The communication apparatus 20 transmits the information picked up by the processing apparatus 10 based on the data requested by the request identification code to the external server 30 through the communication unit 25. As such, the information having been picked up, by the processing apparatus 10 not connected to the communication line, based on the data requested by the request identification code, may be easily acquired by the external server 30 through the communication apparatus 20. Note that the communication apparatus 20 may transmit the information to the external server 30 in the format of the reply identification code, and the external server 30 may have a program for converting the information in the reply identification code into a character string. The external server 30 may display the information picked up by the processing apparatus 10 based on the data requested by the request identification code on the display section 33. For example, the information picked up based on the data requested by the request identification code may include "2022/12/23, 15:23:13", which is the information concerning the occurrence frequency of the same error that has most recently occurred; "most recent conveyance data change is change of the drawing height from 120.0 to 120.5" which is the history of the change of the conveyance data that has occurred most recently; and "312 sheets", which is the information concerning the number of processed sheets since the power was turned on most recently. Therefore, the responder 200 of the external server 30 may be notified of the change of the reference position by 0.5 mm due to the conveyance data change at 15:23:13 on Dec. 23, 2022. Accordingly, the man-hours of the operator 300 operating the processing apparatus 10 to provide the external server 30 with the information, which was picked up based on the data requested by the request identification code, by the processing apparatus 10 not connected externally to devices such as the external server 30 through the communication line, may be reduced.

In the third process included in the information transmission method, the execution command step, the execution identification code display step, and the execution control step are executed.

In the execution command step, the external server 30 transmits an execution instruction value suitable for controlling the processing apparatus 10 to the communication apparatus 20. The execution instruction value for controlling the processing apparatus 10 includes, for example, a setting value for controlling behaviors of the processing apparatus 10 and an execution value for instructing driving of the units that compose the processing apparatus 10. The execution instruction value may include, for example, a setting value and an execution value of the units that drive the processing apparatus 10. The setting value may include, for example, an instruction for returning the drawing height in the conveyance data by 0.5 mm, that is, a setting value for setting the drawing height to 120.5 mm. The external server 30 may receive, for example, the execution instruction value input through the input device 34 based on the operation by the responder 200. The external server 30 transmits the execution instruction value received from the responder 200 to the communication apparatus 20 through the communication line such as the Internet.

In the execution identification code display step, the communication apparatus 20 generates and displays the execution identification code including the execution instruction value according to a request from the external server 30 on the display 23 of the communication apparatus 20.

The execution identification code is composed of an identification code including an execution instruction value. That is, in the execution identification code, an execution instruction value desired by the responder 200 for controlling the processing apparatus 10 is embedded. Items of the data may be a character string, a numerical value, a symbol, or the like.

In the above-described embodiment, when an error occurs in the processing apparatus 10, the processing apparatus 10 may automatically generate an error information identification code to be displayed and display the generated error information identification code on the display 13. In the above-described embodiment, the external server 30 may transmit the execution instruction value to the communication apparatus 20 in a format of a character string or a numerical value, and the communication apparatus 20 may generate an execution identification code and display the execution identification code on the display 23. Alternatively, the external server 30 may generate the execution identification code including the execution instruction value and transmit the information to the communication apparatus 20 in the format of the execution identification code.

In the above-described embodiment, the communication apparatus 20 may display the execution identification code generated as requested by the automatic response program of the external server 30 on the display 23. Alternatively, communication apparatus 20 may display, on the display section 23, an execution identification code generated according to a request from the responder 200 who has inspected the error information displayed on the external server 30.

In the execution control step, the processing apparatus 10 reads the execution identification code through the image capturing unit 16 installed in the processing apparatus 10.

For example, when the communication apparatus 20 displays a QR code as the execution identification code on the display 23, the processing apparatus 10 may acquire the execution instruction value from the communication apparatus 20 by activating the image capturing unit 16 and reading the QR code displayed on the communication apparatus 20 through the image capturing unit 16.

Thereafter, in the processing apparatus 10, the control unit 11 of the processing apparatus 10 controls the processing apparatus 10 based on the execution instruction requested by the execution instruction value. For example, when the execution instruction value includes a setting value for setting the drawing height to 120.5 mm which is input by the responder 200 through the external server 30, the controller 111 composing the control unit 11 of the processing apparatus 10 controls the setting of the drawing height to 120.5 mm based on the execution instruction requested by the execution instruction value. As such, by the execution identification code including the information concerning the instruction for executing a specific process, the processing apparatus 10 is enabled to change the setting value of the processing apparatus 10 and drive the units composing the processing apparatus 10.

Optionally, the storage 112 of the processing apparatus 10 may store a program that may output a designated data item as the error identification code, a program that may rewrite the setting information of the components, and commands that may drive the components, in association with the error codes and the execution instructions requested from or acquired from the external server 30. Accordingly, information concerning the data items to be requested to the processing apparatus 10 and the execution instruction values from the responsive device may be minimized, and the number of one-dimensional codes and two-dimensional codes may be reduced. Optionally, moreover, the processing apparatus 10 may be automatically responsive to rewrite the setting information and drive the units based on the execution instructions requested by the execution instruction value.

Next, the first process of the information transmission method implemented by the information transmission system 1 will be described with reference to FIG. 2.

First, for example, when an error that a conveyer arm failed to draw the frame out of the cassette occurs in the processing apparatus 10, the control unit 11 generates an alarm through, for example, the display 13. The operator 300 recognizing the alarm may input an instruction to clear the alarm by a pressing operation input through the input device 14, and when the control unit 11 receives the input, the control unit 11 clears the alarm. Further, when a two-dimensional code generation button is clicked with an input instruction by the operator 300 through the input device 14, the processing apparatus 10 generates an error identification code indicating error information (step S11). The processing apparatus 10 displays the generated error identification code on the monitor of the display 13 (step S12).

The communication apparatus 20 reads the error identification code generated by the processing apparatus 10 (step S13) and transmits the error information included in the read error identification code to the external server 30 (step S14).

The external server 30 receives the error information transmitted from the communication apparatus 20 (step S15) and displays the received error information on the monitor of the display 33. The responder 200 may easily recognize the content of the error information by the error information displayed on the display 33.

In the first process, the error identification code including the error information is displayed on the processing apparatus 10, the communication apparatus 20 reads the error identification code displayed on the processing apparatus 10, and the error information included in the error identification code is transmitted to the external server 30. Thereby, the error information of the processing apparatus 10 not connected to the communication line is transmitted easily to the external server 30. Accordingly, the responder 200 may recognize the content of the error information transmitted to the external server 30 easily through the monitor of the display 33.

On the other hand, conventionally, when a trouble occurs in the processing apparatus 10 that is not connected to the network enabling communication with the external server 30, informing the responder 200, such as a manufacturer engineer or another operator of the processing apparatus 10 at a remote location, of the situation of the processing apparatus 10 may take longer man-hours. According to the embodiment with the first process, the man-hours of the operator 300 who operates the processing apparatus 10 not connected externally to the outside such as the external server 30 through the communication line to transmit the situation of the processing apparatus 10 to the external server 30 may be reduced.

Next, the second process of the information transmission method implemented by the information transmission system 1 will be described with reference to FIG. 3.

First, when the external server 30 receives an instruction input through the input device 34 by the responder 200 who recognized the content of the error information in the first process, the external server 30 transmits request items requested by the responder 200 as the information concerning the types of data necessary for the error analysis to the communication apparatus 20 (step S31). The communication apparatus 20 generates a request identification code in response to the request transmitted from the external server 30 (step S32). The communication apparatus 20 displays the generated request identification code on the monitor of the display 23 (step S33).

The processing apparatus 10 reads the request identification code displayed by the communication apparatus 20 through the image capturing unit 16 installed in the processing apparatus 10 (step S34). The processing apparatus 10 picks up the corresponding information from the information stored in the storage 112 of the processing apparatus 10 based on the request items included in the request identification code (step S35).

The processing apparatus 10 generates a reply identification code based on the information picked up based on the data requested by the request identification code (step S36). The processing apparatus 10 displays the generated reply identification code on the monitor of the display 13 (step S37).

The communication apparatus 20 reads the reply identification code generated by the processing apparatus 10 (step S38) and transmits the information picked up by the processing apparatus 10 based on the data requested by the request identification code included in the read reply identification code to the external server 30 (step S39).

The external server 30 receives the information transmitted from the communication apparatus 20 and picked up by the processing apparatus 10 based on the data requested by the request identification code (step S40) and displays the information picked up by the processing apparatus 10 based on the data requested by the request identification code received by the external server 30 on the monitor of the display 33. With the information being displayed on the display 33, which is the information picked up based on the data requested by the request identification code, the responder 200 may recognize the content of the information picked up by the processing apparatus 10 based on the data requested by the request identification code easily.

In the second process, the communication apparatus 20 generates the request identification code corresponding to the request items requested by the external server 30 and displays the generated request identification code on the display 23. The processing apparatus 10 reads the request identification code generated by the communication apparatus 20. Further, the processing apparatus 10 generates the reply identification code corresponding to the read request identification code and displays the generated reply identification code on the display 13. The communication apparatus 20 reads the reply identification code generated by the processing apparatus 10 and transmits the reply identification code to the external server 30. Thereby, the information concerning the processing apparatus 10 not connected to the communication line having been picked up based on the data requested by the request identification code is transmitted to the external server 30 easily. Accordingly, the responder 200 may recognize the content of the information picked up by the processing apparatus 10 based on the data requested by the request identification code transmitted to the external server 30 through the monitor of the display 33 easily.

Next, the third process of the information transmission method implemented by the information transmission system 1 will be described with reference to FIG. 4.

First, the external server 30 receiving an instruction input through the input device 34 by the responder 200 who recognizes the content of the information transmitted in reply to the request items in the second process transmits an execution instruction value necessary for the responder 200 to clear the error to the communication apparatus 20 (step S51). The communication apparatus 20 generates the execution identification code in response to the request transmitted from the external server 30 (step S52). The communication apparatus 20 displays the generated execution identification code on the monitor of the display 23 (step S53).

The processing apparatus 10 reads the execution identification code generated by the communication apparatus 20 through the image capturing unit 16 installed in the processing apparatus 10 (step S54). The processing apparatus 10 controls the processing apparatus 10 based on the execution instruction requested by the execution instruction value (step S55).

In the third process, the execution identification code read by the processing apparatus 10 includes an execution instruction value for instructing the processing apparatus 10 to execute a specific process, and thereby the processing apparatus 10 may change the setting of the processing apparatus 10 and control driving of the units composing the processing apparatus 10. As such, the processing apparatus 10 not connected to the communication line may be instructed to execute the specific process. Therefore, the responder 200 may cause the processing apparatus 10 to execute the process indirectly, the man-hours of the operator 300 who operates the processing apparatus 10 may be reduced.

This disclosure includes the following inventions.
(Additional Note 1)

An information processing system comprising:

a processing apparatus configured to process an objective material, the processing apparatus comprising:

a display; and a controller configured to:

generate an error identification code indicating error information concerning an error occurring in the processing apparatus, and control the display to display the generated error identification code; and a communication apparatus comprising an image capturing device and a communication device, the communication device being configured to, when the image capturing device is operated to read the generated error identification code displayed on the display, transmit the error information included in the error identification code externally; and a responsive device connected communicably with the communication apparatus, the responsive device being configured to receive the error information transmitted from the communication apparatus.

What is claimed is:

1. An information transmission method to be implemented in an information transmission system including a processing apparatus configured to process an objective material, a communication apparatus, and a responsive device communicably connected with the communication apparatus, the method comprising:

controlling the processing apparatus to generate an error identification code indicating error information concerning an error occurring in the processing apparatus and controlling a display in the processing apparatus to display the generated error indication identification code; and controlling an image capturing unit in the communication apparatus to read the error identification code displayed on the display in the processing apparatus and controlling a communication unit in the communication apparatus to transmit the error information included in the error identification code to the responsive device, wherein the responsive device, in response to the error information:

transmits a request for a type of data necessary for analyzing the error among information recorded in the processing apparatus to the communication apparatus; and/or transmits an execution instruction value suitable for controlling the processing apparatus to the communication apparatus.

2. An information transmission method to be implemented in an information transmission system including a processing apparatus configured to process an objective material, a communication apparatus, and a responsive device communicably connected with the communication apparatus, the method comprising:

controlling the processing apparatus to generate an error identification code indicating error information concerning an error occurring in the processing apparatus and controlling a display in the processing apparatus to display the generated error indication identification code;

controlling an image capturing unit in the communication apparatus to read the error identification code displayed on the display in the processing apparatus and controlling a communication unit in the communication apparatus to transmit the error information included in the error identification code to the responsive device;

controlling the responsive device to transmit a request for a type of data necessary for analyzing the error among information recorded in the processing apparatus to the communication apparatus;

controlling the communication apparatus to generate a request identification code requesting the data necessary for analyzing the error according to the request from the responsive device and controlling a display in the communication apparatus to display the generated request identification code;

controlling an image capturing unit in the processing apparatus to read the request identification code displayed on the display in the communication apparatus;

controlling the processing apparatus to generate a reply identification code including the data requested by the request identification code and controlling the display in the processing apparatus to display the generated reply identification code; and controlling the image capturing unit in the communication apparatus to read the reply identification code displayed on the display in the processing apparatus and controlling the communication unit in the communication apparatus to transmit information included in the reply identification code to the responsive device.

3. An information transmission method to be implemented in an information transmission system including a processing apparatus configured to process an objective material, a communication apparatus, and a responsive device communicably connected with the communication apparatus, the method comprising:

controlling the processing apparatus to generate an error identification code indicating error information concerning an error occurring in the processing apparatus and controlling a display in the processing apparatus to display the generated error indication identification code;

controlling an image capturing unit in the communication apparatus to read the error identification code displayed on the display in the processing apparatus and controlling a communication unit in the communication apparatus to transmit the error information included in the error identification code to the responsive device;

controlling the responsive device to transmit an execution instruction value suitable for controlling the processing apparatus to the communication apparatus;

controlling the communication apparatus to generate an execution identification code including the execution instruction value according to a request from the responsive device and controlling a display in the communication apparatus to display the generated execution identification code; and controlling an image capturing unit in the processing apparatus to read the execution identification code displayed on the display in the communication apparatus and controlling the processing apparatus based on an execution instruction as requested by the execution instruction value included in the execution identification code read by the image capturing unit in the processing apparatus.

* * * * *